Dec. 27, 1955  F. M. GLASS  2,728,861

RADIATION POCKET SCREAMER

Filed Dec. 31, 1952

INVENTOR
*Floyd M. Glass*
BY
*Roland A. Anderson*
ATTORNEY

United States Patent Office 2,728,861
Patented Dec. 27, 1955

2,728,861

RADIATION POCKET SCREAMER

Floyd M. Glass, Oak Ridge, Tenn., assignor to the United States of America as represented by the United States Atomic Energy Commission Application December 31, 1952, Serial No. 329,032

8 Claims. (Cl. 250—83.6)

The present invention relates to radiation detection devices, and more especially to an improved, portable and compact radiation monitor which provides a warning signal after a predetermined amount of radiation has been received by the bearer.

Portable radiation meters customarily carried by personnel working with radioactive materials have heretofore been pocket ionization chambers and film badges. With both of these devices, it is necessary for the worker to turn in the device to a laboratory, where the amount of radiation can be measured and calculated from the loss of charge of the pocket chamber or the blackening of the film. Electrometers have been developed in which a fiber is moved across a calibrated scale by ionizations within the body of the instrument, so that the worker may at any time read the amount of dosage to which he has been exposed by observing the position of the fiber on the scale.

With any of the pocket alarm devices of the prior art, the worker may not know of the excessive amount of radiation to which he is being exposed until the alarm sounds, indicating that he has already received tolerance exposure, unless a relatively expensive microammeter is provided in the associated electronic circuit. While it is highly desirable to inform the worker before he has been over exposed to radiation, rather than after the exposure, so that he may take immediate steps to avoid the lethal radiation, the high initial cost, maintenance requirements, susceptibility to field damage, and added space requirements of an indicating meter are such that it is to be avoided, if possible. A warning device should be small and rugged, so that it could be regularly carried by active personnel without damage or accidental discharge. The device should also produce an unmistakable warning signal of the audible type before over-exposure has occurred. Electromechanical relays and the like should not be utilized, in order to insure maximum trouble-free life of the instrument.

Accordingly it is a primary object of my invention to provide a radiation warning device which will produce an audible signal at a selected level of radiation.

An object of my invention is to provide a simple, calibrated pocket meter with which the bearer may determine the radiation dosage he has received without losing the previous integrated dosage reading of the device during the determination.

A further object of my invention is to provide a portable, compact, audible warning device suitable for field use over extended periods of time.

Another object of my invention is to provide a simple but rugged warning device without relays or other moving parts which requires minimum drain from energizing potential sources in order to increase the useful field life of the instrument.

Other objects and advantages of my invention will be apparent from the following detailed description, when read in connection with the drawings appended, in which.

My invention contemplates a thermionic tube having attached to its control grid a condenser in the form of an ionization chamber. The grid of the tube is lowered below cut-off potential by charging the chamber from a source of positive potential, then switching the outer electrode of the chamber from the high voltage to ground, thus forcing the control grid below ground by an amount equal to the charge built up across the chamber. The charge placed on the chamber and the capacity thereof are so inter-related with the characteristics of the thermionic tube that a predetermined critical total amount of radiation falling upon the chamber will raise the grid potential of the tube to the point where the tube will begin to conduct. At this point an alarm is made to operate by a relaxation oscillator circuit connected to the anode of the tube. The oscillator includes a gas discharge tube shunted by a crystal transducer, which serves the dual purpose of a condenser for inducing oscillation in the gas discharge tube and a transducer for producing an audible signal responsive to the very oscillations it induces.

Figure 1:
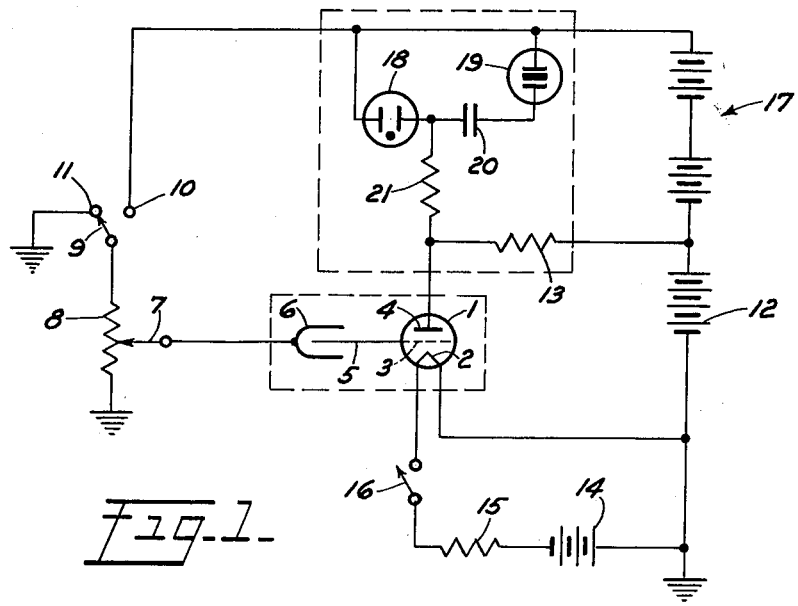
Fig. 1 is a schematic representation of a preferred embodiment of my improved radiation alarm.

Referring now to Fig. 1, thermionic tube 1 is provided with cathode 2, grid 3, and anode 4. One electrode 5 of the ionization chamber is connected directly to the grid 3, while another electrode 6 of the chamber is connected through moveable arm 7 of potentiometer 8 to ground and to switch arm 9. The switch arm may engage one of two contacts: contact 10 is the reset position, while contact 11, connected to ground, is the normal operating position. Tube 1 is energized by potential source 12, coupled in the anode-cathode circuit path through resistor 13. Current for heating cathode 2 may be provided from potential source 14 through limiting resistor 15 and switch 16. The latter switch serves as an on-off control for the warning device and is thrown to the closed position to energize tube 1. A further potential source 17 may comprise two 30 volt dry cell batteries connected in series with source 12. To the positive terminal of source 17 are coupled a gas discharge tube 18 and a crystal transducer 19. A small blocking condenser 20 serves to keep D. C. potential off the crystal. Resistor 21 is coupled at one terminal to the junction of the gas tube and the blocking condenser and at the other terminal to the anode 4 of tube 1, to couple the anode potential to the gas-tube circuit. In this manner, a fall in potential of the anode will cause a greater voltage to be applied across the gas tube.

Figure 2:
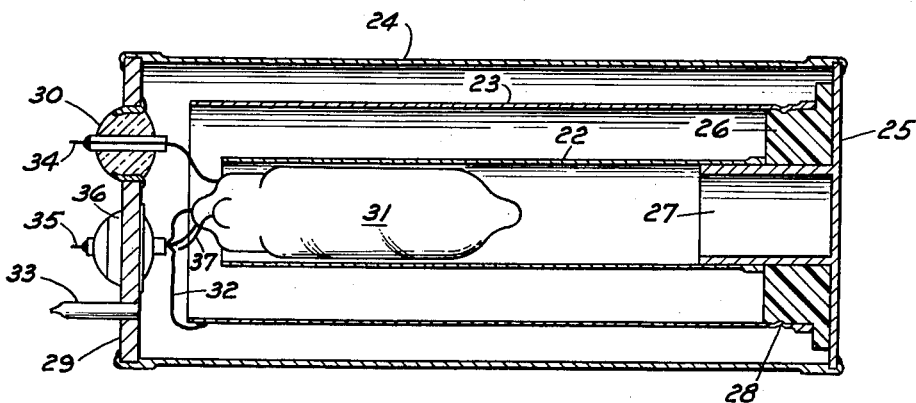
Fig. 2 is a detailed assembly drawing of an ion chamber especially suitable for and forming an integral part of the invention.

Referring now to Fig. 2, one configuration of an ion chamber suitable for the storage capacitance of my invention may comprise three concentric tubes 22, 23, 24. Tubes 22, 24 correspond to the outer electrode 6 of Fig. 1, while tube 23 corresponds to the collector electrode 5 of Fig. 1. End plate 25 closes one end of the outer cylinder 24 and serves to mount flanged cylindrical insulator 26 and support tube 27. Inner electrode 22 is press fit over tube 27, and abuts against one face of insulator 26. Electrode 23 is press fit over the cylindrical surface of the insulator, and may be crimped or dimpled as shown at numeral 28 so as to remain rigidly in place. Header 29 may be provided with three gas-tight, feed-through insulators such as Kovar seals, two of which are indicated by the numerals 30, 36. The other seal is not shown, but is disposed in the cutaway portion of the header. The vacuum tube may be suspended inside electrode 22. The anode lead 34 and the two cathode leads 35, 37 are taken through the gas tight insulators, while grid lead 32 is electrically connected to electrode 23.

Lead 37 extends through the third seal, not shown, in header 29. Tubing 33 is provided for evacuation and filling of the chamber, and may be crimped and sealed after filling, before use.

The concentric electrodes are preferably aluminum, but may be brass or other suitable materials. Metals having a low atomic number give a response more desirable for radiation dose monitoring than do those having a high atomic number. A dry gas such as nitrogen or air is preferable for filling the chamber, but xenon, krypton, or the like could be utilized to obtain a different energy response of the instrument. The present chamber was designed for alarm at a maximum dosage of 100 milliroentgens. For a given charging voltage, the capacitance to volume ratio determines the maximum integrated dose of the alarm. It is desirable to make the chamber volume as large as is practicable, so that the ratio of chamber ion current to leakage current is very large, in order to minimize leakage errors. Ordinary two-electrode chambers of a given volume do not furnish sufficient capacitance for a 100 milliroentgens chamber, so that the three-electrode construction is preferred. The capacitance obtained is substantially 20 micromicro farads, with an active volume of 34 cc. The pressure commonly employed in the chamber is about 1 atmosphere, but the exact pressure for each chamber is determined by comparing the response of a chamber to a calibrated radiation source with the desired response curve, and altering the pressure to optimize the response.

In operation of the preferred embodiment above described, switch 16 is first closed, allowing current to flow in the cathode circuit of tube 1. Anode 4 is energized by 30 volt source 12, so that space current would flow in the tube were grid 3 above cut-off potential. Switch arm 9 is thrown to engage contact 10, thereby impressing 90 volts from sources 12 and 17 across potentiometer 8. A selected portion of the voltage across potentiometer 8 is picked off by arm 7 and charges ion chamber electrode 6 positive with respect to electrode 5. After the charging is complete, arm 9 is thrown to engage contact 11, thus grounding electrode 6 and driving electrode 5 below ground by an amount equal to the voltage built up across the chamber during the charging operation.

Now as radiation impinges on the chamber, the gas molecules therein are ionized, with positive ions collecting on electrode 5 and negative ions or electrons being attracted to electrode 6. The potential of grid 3 is thus raised until, after a predetermined amount of radiation has impinged upon the chamber, grid 3 will arrive at cut-off potential and space current will begin to flow through the tube 1. The flow of space current through very large resistor 13 will cause the potential of anode 4 to fall, thus increasing the potential difference across the two electrodes of the gas discharge tube 18. The voltage applied from source 17 across tube 18 and resistors 21 and 13 is insufficient to cause breakdown of the tube, but the additional voltage input caused by the drop of anode potential of tube 1 will cause gas tube 18 to break down, allowing a large current flow through the gas tube. Crystal transducer 19 forms a storage capacitor which will be charged from the batteries and discharged by the passage of current through tube 18. Current flows through tube 18 until the voltage thereacross, as determined by the degree of discharge of transducer 19, falls below a critical value, at which time the tube will cease conducting. The crystal transducer will then accept a further charge from the batteries and from current flow in tube 1 until the firing potential of tube 18 is again reached, at which time the tube will break down and again discharge the stored charge on crystal 19.

As the chamber is subjected to more radiation, the potential of grid 3 continues to rise, the potential of anode 4 continues to fall, and the crystal transducer element 19 charges more rapidly, because of the increased potential thereacross. Therefore the breakdown of gas tube 18 will become more frequent. The increase in frequency of charge and discharge of the crystal causes the audible signal emitted by transducer 19 to have a higher frequency or pitch.

Thus an audible signal is produced when a critical radiation dosage, as measured by the ion chamber, has been received, and as radiation dosage continues to increase the warning signal rises in pitch, warning the bearer of his increased danger.

Another function of the potentiometer 8 which is not readily apparent is that of providing means by which the bearer may determine the total radiation dose to which he has been exposed without the necessity for recharging the device. This feature is especially useful where a tolerance per day is established, and the pocket alarms are carried each working day on the person and turned in for recharging over night. In order to measure the dose received the bearer may take the following steps: (1) He moves potentiometer arm 7 to the grounded end of the winding, marked as zero on the dial. (2) He throws switch arm 9 to engage contact 10, thereby connecting the 90 volt battery supply across the potentiometer. (3) He slowly moves the potentiometer arm 7 toward the positive end of the potentiometer, thereby bringing electrode 5 and grid 3 more positive, until the alarm sounds. (4) He throws arm 9 to engage contact 11. The amount of travel of the arm before the alarm sounds is determined by the amount grid 3 is below cut-off, and therefore is proportional to the charge on the chamber and to the radiation dose received. A calibrated dial on the potentiometer serves to relate the arm movement to dosage in milliroentgens. Step 4 above drives grid 3 below ground by an amount proportional to the remanent charge on the chamber, so that the bearer may resume use of the device without recharging and without losing the previous integrated dosage reading of the chamber.

In a preferred embodiment of the invention tube 1 may be Victoreen type 5803; gas tube 18 may be a neon bulb type NE2; batteries 12 and 17 may be 30 volt Eveready cells No. 507E; source 14 may be 1½ volt Eveready cell No. 1015E; potentiometer 8 may have value of 1 megohm; resistor 15 may have a value of 22 ohms; resistor 21 may have a value of 680,000 ohms; resistor 13 may have a value of 10 megohms; and condenser 20 may have a value of .005 microfarad. Crystal transducer 19 may be of the type furnished in assembly A-1, No. 205, distributed by the Brush Development Company of Cleveland, Ohio, for a radio head phone, with the associated resistor and condenser removed.

It is apparent from the foregoing that I have provided a novel portable radiation warning device capable of providing an audible signal of loud intensity at a preselected radiation level, and of increasing the pitch of the signal provided as a further warning if more radiation is encountered by the bearer. I have further provided novel means for enabling the bearer to determine the radiation dosage he has received without losing the reading already registered on the device, in a manner heretofore unknown to the art.

Having thus described my invention I claim:

1. In a radiation alarm device, a thermionic tube having at least cathode, grid, and anode electrodes, an ionization chamber forming a storage condenser and provided with at least first and second electrodes, said first grid being coupled to said first electrode, sources of potential for energizing said cathode and anode, and a further source of potenial switch means provided with an arm and a pair of contacts, said arm being coupled to said second chamber electrode, one of said contacts being coupled to the positive terminal of said further potential source, the other contact being coupled to a point of common reference of lower potential than said anode, whereby said further potential source is utilized in charging said chamber when said arm engages said one contact, and said grid potential is lowered below cut-off when said arm engages said other contact, a load resistor for said tube, a gas discharge tube, means coupling said further source of potential to said gas tube and said resistor for energizing said gas tube, and a crystal transducer element connected in shunt with said gas tube, whereby a selected alteration of said grid potential by radiations allows space current to flow through said load resistor, increasing the voltage across said gas tube above breakdown voltage and exciting said crystal to produce an audible warning.

2. In a radiation alarm device, a thermionic tube having at least cathode, grid, and anode electrodes, an ionization chamber forming a storage condenser and provided with at least first and second electrodes, said grid being coupled to said first electrode, sources of potential for energizing said cathode and anode, and a further source of potential switch means provided with an arm and a pair of contacts, a potentiometer having a movable contact coupled to said second chamber electrode and a winding coupled between said switch arm and a point of common reference of lower potential than said anode, one of said contacts being coupled to the positive terminal of said further potential source, the other contact being coupled to said point of reference, whereby said further potential source is utilized in charging said chamber when said arm engages said one contact, and said grid potential is lowered below cut-off when said arm engages said other contact, a load resistor for said tube, a gas discharge tube, means coupling said further source of potential between said gas tube and said resistor for energizing said gas tube, and a crystal transducer element connected in shunt with said gas tube, whereby a selected alteration of said grid potential by radiations allows space current to flow through said load resistor, increasing the voltage across said gas tube above breakdown voltage and exciting said crystal to produce an audible warning.

3. In an alarm device, a relaxation oscillator comprising a gas discharge device, a load impedance, and a source of potential connected in series circuit; and a crystal transducer connected in parallel with said discharge device for energy storage, said source being sufficiently large to charge said transducer above the firing voltage of said discharge device, and said impedance being such that the voltage across said discharge device falls below cut-off after each firing, alternate charging and discharging of said transducer producing an audible warning.

4. In an alarm device, a relaxation oscillator comprising a gas discharge device, a load impedance, and a source of potential connected in series circuit; and a network comprising a blocking condenser and a crystal transducer connected in series circuit, said network being connected in parallel with said discharge device for energy storage; said source being sufficiently large to charge said transducer above the firing voltage of said discharge device, and said impedance being such that the voltage across said discharge device falls below cutoff after each firing, alternate charging and discharging of said transducer producing an audible warning.

5. In an alarm device, a relaxation oscillator comprising a gas discharge device, a load impedance, and a source of potential connected in series circuit; a crystal transducer connected in parallel with said discharge device for energy storage, said source being insufficient to charge said transducer capacitor above the firing voltage of said discharge device; and means for applying an additional charge to said transducer sufficient to fire said discharge device responsive to occurrence of a control condition, said impedance being such that the voltage across said discharge device falls below cutoff after each firing.

6. In an alarm device, a relaxation oscillator comprising a gas discharge device, a load impedance, and a source of potential connected in series circuit; a network comprising a blocking condenser in series with a crystal transducer, said network being connected in parallel with said discharge device for energy storage, said source being insufficient to charge said transducer above the firing voltage of said discharge device; and means for applying an additional charge to said transducer sufficient to fire said discharge device upon occurrence of a control condition, the magnitude of said impedance being sufficient to cause the voltage across said discharge device to fall below cut-off after each firing.

7. In an alarm device, a relaxation oscillator comprising a gas discharge device, a load impedance, and a source of potential connected in series circuit; and a crystal transducer connected in parallel with said discharge device for energy storage, said source being insufficient to charge said transducer capacitor above the firing voltage of said discharge device; and means for supplying an additional charge to said transducer sufficient to fire said discharge device upon occurrence of a control condition, said means comprising an electron tube, sources of potential for energizing said tube, an ionization chamber coupled to said tube to control the current therethrough responsive to the discharge of said chamber by radiation, and means coupling said tube current to said transducer.

8. In an alarm device, a relaxation oscillator comprising a gas discharge device, a load impedance, and a source of potential connected in series circuit; and a network comprising a blocking condenser in series with a crystal transducer, said network being connected in parallel with said discharge device for energy storage, said source being insufficient to charge said transducer above the firing voltage of said discharge device, and means for supplying an additional charge to said transducer sufficient to fire said discharge device upon occurrence of a control condition, said means comprising an electron tube, sources of potential for energizing said tube, an ionization chamber coupled to said tube to control the current therethrough responsive to the discharge of said chamber by radiation, and means coupling said tube current to said transducer.

References Cited in the file of this patent

UNITED STATES PATENTS

| | | |
|---|---|---|
| 2,122,222 | Vingerhoets | June 28, 1938 |
| 2,288,718 | Kallmann, et al. | July 7, 1942 |
| 2,401,723 | Deming | June 11, 1946 |
| 2,574,000 | Victoreen | Nov. 6, 1951 |